US010416869B2

(12) United States Patent
Tani et al.

(10) Patent No.: US 10,416,869 B2
(45) Date of Patent: Sep. 17, 2019

(54) INFORMATION PROCESSING APPARATUS THAT SCROLLS AND DISPLAYS CONTENTS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Kazuteru Tani, Yokohama (JP); Satoshi Igeta, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/722,428

(22) Filed: Oct. 2, 2017

(65) Prior Publication Data
US 2018/0101288 A1  Apr. 12, 2018

(30) Foreign Application Priority Data
Oct. 11, 2016 (JP) .................. 2016-200148

(51) Int. Cl.
*G06F 3/048* (2013.01)
*G06F 3/041* (2006.01)
*G06F 3/0485* (2013.01)
*G06F 3/038* (2013.01)
*G06F 3/0488* (2013.01)

(52) U.S. Cl.
CPC ............ *G06F 3/0485* (2013.01); *G06F 3/038* (2013.01); *G06F 3/0412* (2013.01); *G06F 3/0416* (2013.01); *G06F 3/04883* (2013.01)

(58) Field of Classification Search
CPC ......... G06F 3/0485; G06F 2203/04806; G06F 3/04812
See application file for complete search history.

(56) References Cited

U.S. PATENT DOCUMENTS

| 5,550,969 | A  | * | 8/1996  | Torres  | G06F 3/04855 345/684 |
| 5,920,302 | A  | * | 7/1999  | Inoue   | G09G 5/346 345/572 |
| 8,364,027 | B2 | * | 1/2013  | Saito   | G11B 27/005 386/248 |
| 9,218,188 | B2 | * | 12/2015 | Matas   | G06Q 50/01 |
| 9,229,632 | B2 | * | 1/2016  | Walkin  | G06F 9/451 |

(Continued)

FOREIGN PATENT DOCUMENTS

JP  4968608 B2  7/2012

*Primary Examiner* — Scott T Baderman
*Assistant Examiner* — Mario M Velez-Lopez
(74) *Attorney, Agent, or Firm* — Rossi, Kimms & McDowell LLP

(57) ABSTRACT

An information processing apparatus that is capable of finding out a desired content in a short time. A display control unit scrolls and displays at least parts of respective contents on a screen by moving the contents in a predetermined direction. A storing unit stores a start-time content displayed at a time of starting to scroll and display the contents in the predetermined direction among the contents. The display control unit makes a displaying part of the start-time content become larger than a displaying part of the other contents when the start-time content is displayed again because a moving direction of the contents is reversed.

10 Claims, 7 Drawing Sheets

(56) References Cited

U.S. PATENT DOCUMENTS

| | | | |
|---|---|---|---|
| 9,235,321 B2* | 1/2016 | Matas | G06F 3/0488 |
| 9,372,536 B2* | 6/2016 | Conte | G06F 3/016 |
| 9,448,687 B1* | 9/2016 | McKenzie | G06F 3/011 |
| 9,696,898 B2* | 7/2017 | Matas | G06F 3/0488 |
| 9,823,828 B2* | 11/2017 | Zambetti | G06F 3/0362 |
| 2007/0226646 A1* | 9/2007 | Nagiyama | G06F 3/016 |
| | | | 715/784 |
| 2009/0138815 A1* | 5/2009 | Mercer | G06F 3/0485 |
| | | | 715/786 |
| 2010/0058240 A1* | 3/2010 | Bull | G06F 3/0482 |
| | | | 715/830 |
| 2010/0164904 A1* | 7/2010 | Kim | G06F 3/038 |
| | | | 345/174 |
| 2015/0007078 A1* | 1/2015 | Feng | G06F 3/0484 |
| | | | 715/771 |
| 2015/0370529 A1* | 12/2015 | Zambetti | G06F 1/1694 |
| | | | 345/156 |

* cited by examiner

FIG. 5A

| CONTENT MANAGEMENT NUMBER (501) | DISPLAY PARAMETER (502) |
|---|---|
| 16 | 10% |
| 15 | 20% |
| 14 | 80% |
| 13 | 40% |
| 12 | 50% |
| 11 | 60% |
| 10 | 70% |
| 9 | 80% |
| 8 | 90% |
| 7 | 100% |

FIG. 5B

| CONTENT MANAGEMENT NUMBER (501) | DISPLAY PARAMETER (502) |
|---|---|
| 25 | 10% |
| 24 | 20% |
| 23 | 30% |
| 22 | 40% |
| 21 | 50% |
| 20 | 60% |
| 19 | 70% |
| 18 | 80% |
| 17 | 90% |
| 16 | 100% |

INFORMATION PROCESSING APPARATUS THAT SCROLLS AND DISPLAYS CONTENTS, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus that scrolls and displays a plurality of contents (such as images, moving image frames, and list data), a control method therefor, and a storage medium storing a control program therefor.

Description of the Related Art

There is a known electric apparatus that is capable of displaying contents, such as images, on a display device equipped with a touch panel and of scrolling and displaying the contents in response to a swipe operation etc. to the touch panel. A user is able to find out a desired content from among the contents by repeating operations to switch a scrolling direction of the contents arranged in a predetermined order between a forward direction and a backward direction (see Japanese Patent Publication No. 4968608).

However, the above-mentioned conventional technique may not awake the user to the content that is a starting point at which the scrolling direction of the contents displayed on the screen was switched to the backward direction from the forward direction when the scrolling direction is switched again to the forward direction from the backward direction after switching to the backward direction from the forward direction. In this case, when a user tries to find out a desired content from a plurality of contents, the user cannot narrow down a range of the contents. Accordingly, there is a problem of taking a time period until finding out the desired content because unnecessary contents are displayed repeatedly.

SUMMARY OF THE INVENTION

The present invention provides an information processing apparatus that is capable of finding out a desired content in a short time.

Accordingly, a first aspect of the present invention provides an information processing apparatus including a display control unit configured to scroll and display at least parts of respective contents on a screen by moving the contents in a predetermined direction, and a storing unit configured to store a start-time content displayed at a time of starting to scroll and display the contents in the predetermined direction among the contents. The display control unit makes a displaying part of the start-time content become larger than a displaying part of the other contents when the start-time content is displayed again because a moving direction of the contents is reversed.

Accordingly, a second aspect of the present invention provides an information processing apparatus including a display control unit configured to scroll and display at least parts of respective contents on a screen by moving the contents in a predetermined direction, and a storing unit configured to store a start-time content displayed at a time of starting to scroll and display the contents in the predetermined direction among the contents. The display control unit makes a moving speed of the start-time content become slower than a moving speed of the other contents when the start-time content is displayed again because a moving direction of the contents is reversed.

Accordingly, a third aspect of the present invention provides a control method for an image processing apparatus, the control method including a display control step of scrolling and displaying at least parts of respective contents on a screen by moving the contents in a predetermined direction, and a storing step of storing a start-time content displayed at a time of starting to scroll and display the contents in the predetermined direction among the contents. The displaying part of the start-time content becomes larger than a displaying part of the other contents in the display control step when the start-time content is displayed again because a moving direction of the contents is reversed.

Accordingly, a fourth aspect of the present invention provides a control method for an image processing apparatus, the control method including a display control step of scrolling and displaying at least parts of respective contents on a screen by moving the contents in a predetermined direction, and a storing step of storing a start-time content displayed at a time of starting to scroll and display the contents in the predetermined direction among the contents. A moving speed of the start-time content becomes slower than a moving speed of the other contents in the display control step when the start-time content is displayed again because a moving direction of the contents is reversed.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, a user is able to find out a desired content in a short time.

Further features of the present invention will become apparent from the following description of exemplary embodiments with reference to the attached drawings.

BRIEF DESCRIPTION OF THE DRAWINGS

FIG. 3A shows a case where a start-time image is included in the displaying objects of image scrolling, and FIG. 3B shows a case where the start-time image is not included in the displaying objects of the image scrolling.

FIG. 5A is a view showing a data configuration corresponding to the case where the start-time image is included in the displaying objects of the image scrolling in the cascade display method in FIG. 3A. FIG. 5B is a view showing a data configuration corresponding to the case where the start-time image is not included in the displaying objects of the image scrolling in the cascade display method in FIG. 3B.

FIG. 6A shows a case where the start-time image is included in the displaying objects of the image scrolling, and FIG. 6B shows a case where the start-time image is not included in the displaying objects of the image scrolling.

DESCRIPTION OF THE EMBODIMENTS

Hereafter, embodiments according to the present invention will be described in detail with reference to the drawings.

Figure 1:
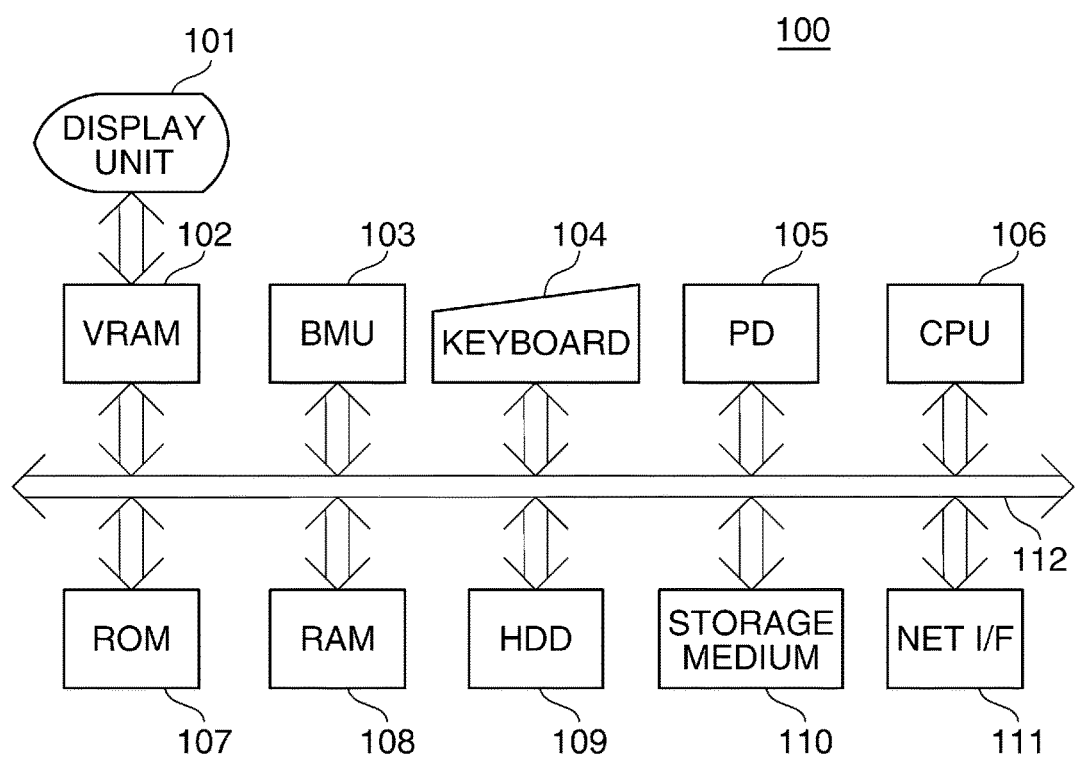
FIG. 1 is a block diagram schematically showing a configuration of an information processing apparatus according to an embodiment of the present invention.

Hereafter, an embodiment according to the present invention will be described with reference to the attached drawings. First, a hardware configuration of the information processing apparatus according to the embodiment of the present invention will be described. FIG. 1 is a block diagram schematically showing the configuration of the information processing apparatus 100. The information processing apparatus 100 has a display unit 101, VRAM 102, BMU (Bit Move Unit) 103, keyboard 104, PD (Pointing Device) 105, CPU 106, ROM 107, RAM 108, HDD 109, storage medium 110, network I/F 111 and bus 112. The information processing apparatus 100 is a personal computer (PC (a tablet PC is included)), for example.

The display unit 101, such as an LCD or an organic electroluminescence display, displays various information including a user interface to an OS and application (software) that run on the information processing apparatus 100. The display unit 101 is provided with a touch panel that is one of the PD 105 in this embodiment. According to various touch operations to the touch panel, a process that is executed by the information processing apparatus 100 is selected, and contents displayed on the display unit 101 are switched.

Data for displaying various information on the display unit 101 is stored into the VRAM 102. The data stored in the VRAM 102 is transferred to the display unit 101 according to predetermined regulation, and thereby, various contents are displayed on the display unit 101. The BMU 103 controls the data transfer between memories (for example, between the VRAM 102 and the RAM 108) and the data transfer between a memory and an I/O device (for example, between the RAM 108 and the network I/F 111).

The keyboard 104 is an input unit that has various keys for inputting a character, a number, etc., and may be a screen keyboard using the touch panel provided on the display unit 101. The PD 105 is an input unit used for designating an icon, a menu, etc. that are displayed on the display unit 101, and is the touch panel provided on the display unit 101 or a mouse.

The ROM 107 is a storage unit that stores control programs, such as BIOS required for booting the information processing apparatus 100, and data. The RAM 108 is a storage unit that has a work area for the CPU 106, a primary storage area for storing various data temporarily, load areas for various programs, etc. The HDD 109 is a storage unit that stores an OS program, various control programs, programs of various applications (software) that are executable on the OS program, various data, etc. It should be noted that a SSD using a flash memory may be employed in place of the HDD 109. The storage medium 110 is a semiconductor storage device, such as a memory card, or an optical disk, such as an DVD-RAM, etc. The storage medium 110 stores data files etc. that are edited by the information processing apparatus 100, for example. It should be noted that the data files that are edited by the information processing apparatus 100 may be stored in the HDD 109.

The CPU 106 totally controls the various hardware units that constitute the information processing apparatus 100 by running various control programs stored in the ROM 107. Moreover, the CPU 106 performs various processes according to the programs by developing the OS program and the application programs that are stored in the HDD 109 etc. to the RAM 108. The application programs may be stored in the storage medium 110. The network I/F 111 is an interface that enables communication between the CPU 106 and an external apparatus (not shown) via a network (not shown). The control program may be provided to the CPU 106 from another information processing apparatus (external apparatus) via the network through the network I/F 111. The bus 112 includes an address bus, a data bus, and a control bus, and enables data communication between the blocks that constitute the information processing apparatus 100. The information processing apparatus 100 has a port for connecting to an external apparatus that conforms to a predetermined regulation, such as a USB regulation, and an interface that enables data communication between the external apparatus connected and the CPU 106.

Next, a displaying state on the display unit 101 of the information processing apparatus 100 will be described. In the following description, the displaying state on the display unit 101 when the user operates the touch panel to find out a desired image file from image files that are stored in the storage medium 110 as examples of contents will be described.

Figure 2:
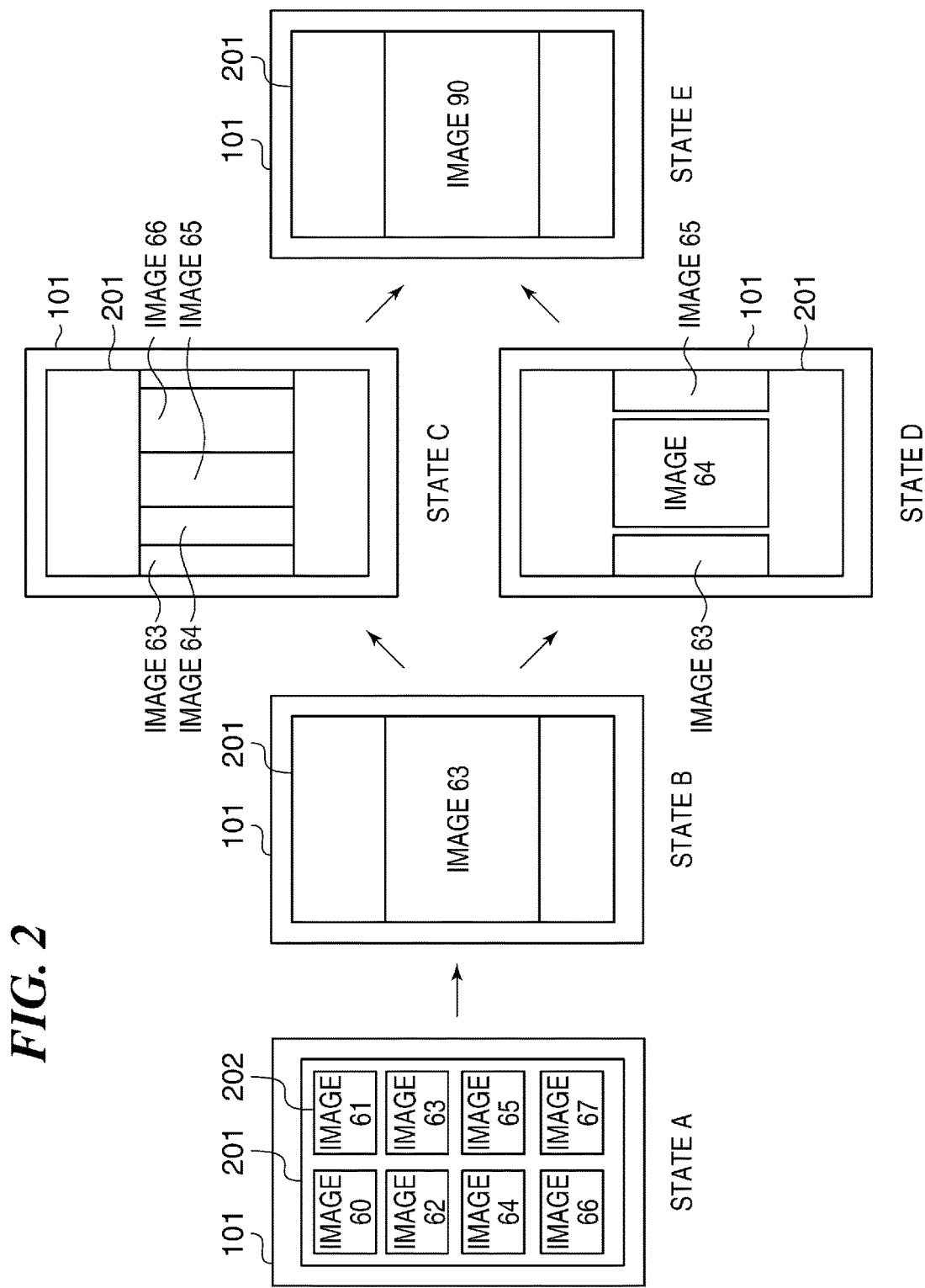
FIG. 2 is a schematic view for describing states of scrolling and displaying contents in the information processing apparatus shown in FIG. 1.

FIG. 2 is a schematic view for describing the displaying state of the display of scrolling images in a predetermined direction first when the information processing apparatus 100 is operated. The display of scrolling images means that a plurality of images are sequentially displayed on the screen of the display unit 101 by moving the images in the predetermined direction.

A state A in FIG. 2 shows a state where thumbnails of a part of image files that the CPU 106 read from the storage medium 110 are listed on the display unit 101. The thumbnails 202 corresponding to the respective image files are displayed on the display screen 201 of the display unit 101. A state B in FIG. 2 shows a state where the thumbnail of the image 63 was selected by a touch operation, such as a tap, to the touch panel from among the thumbnails 202 of the images 60 through 67 displayed on the display screen 201. The serial numbers of the images 60 through 67 shall be allocated as file names of the image files. Moreover, the image selected from the thumbnails 202 shall be adjusted to a size matching an area of the display screen 201, and shall be displayed on the display screen 201.

A user shall first scroll the images in the direction increasing the serial number of the image from the state B where the image 63 is displayed. The image 63 is a start-time image (a start-time content) of the display of scrolling images (hereinafter referred to as "image scrolling"), and the CPU 106 stores the start-time image to the RAM 108. A state C in FIG. 2 shows a first display example displayed on the display screen 201 when the image scrolling is started by a swipe operation to the touch panel of the display unit 101 in the state B. The state C schematically shows a state where the displayed images are changing subsequently in a cascade display method. A state D in FIG. 2 is a view showing a second display example displayed on the display screen 201 when the image scrolling is started by a swipe operation to the touch panel of the display unit 101 in the state B. The state D schematically shows a state where the displayed images are sliding leftwardly on the display screen 201 in a tile display method. The information processing apparatus 100 performs one of the cascade display method like the state C and the tile display method like the state D selectively according to presetting by a user.

A state E in FIG. 2 shows a state where the image scrolling in the predetermined direction was finished and an image 90 that is a final image is displayed. The final image becomes the same whether the way passed through the state C or the state D. As mentioned later, when a swipe operation for scrolling images in the direction opposite to the last image scrolling direction is applied to the touch panel of the display unit 101 in the state E, the display state on the display unit 101 is returned to the state B. Moreover, for example, when a pinch-in operation is applied to the touch panel in the state B, the display state is returned to the state A.

Next, characteristic display control in the image scrolling in the information processing apparatus 100 will be described. In the description, the following case will be taken up and described as an example. As described with reference to FIG. 2, although the user searches the images by scrolling the images in the direction increasing the serial number of the image from the image 63, the user cannot find out the desired image, and the image 90 shall be displayed as shown in the state E. Accordingly, the user shall perform the swipe operation that scrolls the images in the direction decreasing the serial number of the image from the image 90 to find out the desired image. The display control in the information processing apparatus 100 in that case will be described. It should be noted that the image files of the serial numbers 50 through 90 shall be all of the image files stored.

Figure 3A:
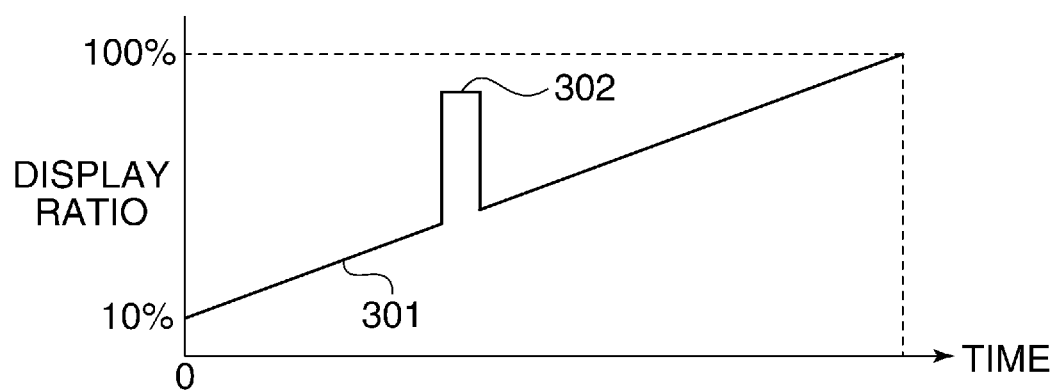
FIG. 3A and FIG. 3B are graphs showing a relationship between elapsed time and a display ratio in a cascade display method in the information processing apparatus shown in FIG. 1.
Figure 4A:
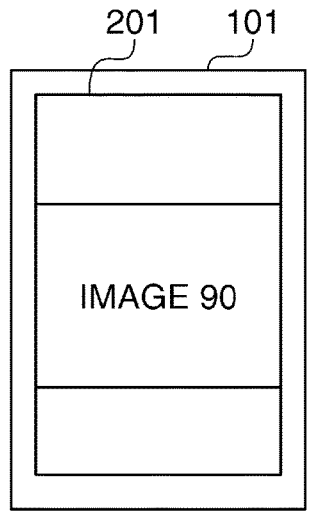
FIG. 4A through FIG. 4E are schematic views showing transition of a display screen in the cascade display method in FIG. 3A.
Figure 4B:
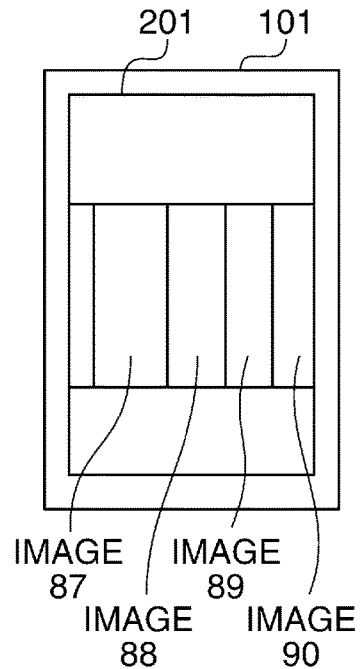
Figure 4C:
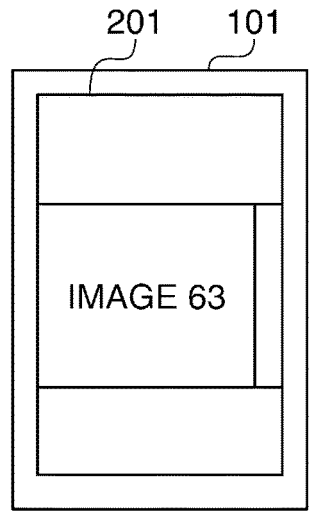
Figure 4D:
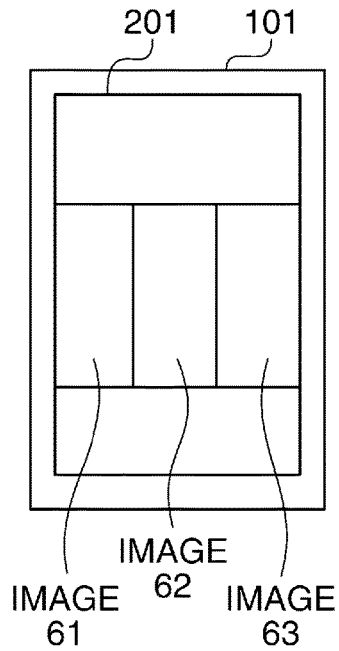
Figure 4E:
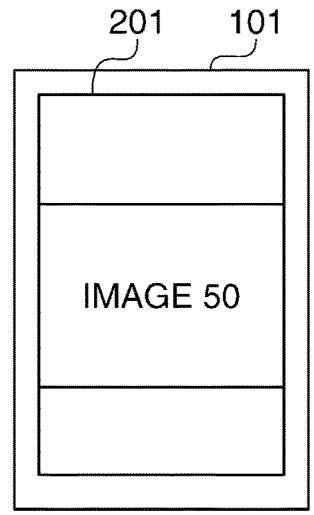

FIG. 3A is a graph showing a relationship between elapsed time and a display ratio in the cascade display method in the information processing apparatus 100. FIG. 4A through FIG. 4E are schematic views showing transition of the display screen 201 in the cascade display method in FIG. 3A. The display screen 201 in FIG. 4A is the same as the state E in FIG. 2. The image 90 is displayed on the display screen 201 before starting the image scrolling. The display ratio of an image at the time of starting the image scrolling is set to 10% as shown in FIG. 3A, and accordingly, the images are displayed as shown in FIG. 4B. The display ratio of an image is a ratio of an area that is displayed visibly for the user to the entire area of the image. For example, when the display ratio of the image is 10%, the area of 90% of the image is hidden by other images. When the display ratio is 100%, the entire image is displayed.

While the images are scrolled and displayed with the passage of time, the display ratio of an image in that case becomes larger along a line 301 in FIG. 3A. Since the image 63 is stored as the start-time image, the CPU 106 makes the image 63 as the start-time image correspond to a discontinuous area 302 and controls so as to increase the display ratio discontinuously at the time of displaying the image 63. As a result, the display screen 201 becomes the state shown in FIG. 4C. Thus, since the start-time image is displayed at the large display ratio after the continuous change of the display ratio so as to break the continuity, the user easily grasps that the display area returned to the start-time image. When the images are further scrolled in the same direction (the direction decreasing the serial number of the image) after displaying the image 63 corresponding to the discontinuous area 302, the display ratio of an image increases along the line 301. Thus, the displaying state varies via the state shown in FIG. 4D, and when the image 50 as a final image is displayed, the display ratio becomes 100% and the state shown in FIG. 4E comes.

Figure 3B:
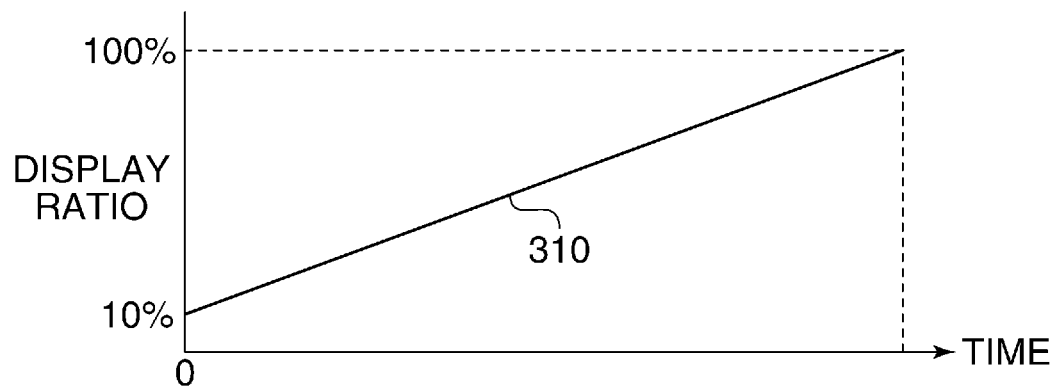

FIG. 3B is a graph showing a relationship between elapsed time and the display ratio in the cascade display method in a case where the start-time image is not included in the displaying objects of the image scrolling. The display ratio of an image at the time of starting the image scrolling is set to 10%, becomes larger as shown by a straight line 310 with the passage of time, and becomes 100% at the time of displaying the final image. Although the slope of the straight line 310 is fundamentally the same as the slope of the line 301, the straight line 310 of which the slope is always constant differs from the line 301 that has the discontinuous area 302 in which the slope varies rapidly. It should be noted that the change of the display screen from the state A to the state E through the state B and the state C in FIG. 2 (the first image scrolling) follows the straight line 310. Accordingly, the display of the images is controlled so that the overlapped range in the cascade display is adjusted by considering an operation speed for the image scrolling, etc., and so that the image scrolling stops without discomfort with the passage of time in the first image scrolling.

FIG. 5A and FIG. 5B are tables showing examples of data configurations for scrolling the images in the cascade display method. FIG. 5A shows an example of the data configuration in a case where the start-time image is included in the displaying objects of the image scrolling, and corresponds to FIG. 3A. A content management number 501 is a serial number that the CPU 106 gives to an image displayed on the display unit 101 for inner management in the case of the image scrolling. Accordingly, the content management numbers 501 are different from the serial numbers of the images (the image file names) shown in FIG. 2A etc., and are not restricted to the serial numbers shown in FIG. 5A.

A display parameter 502 shows the display ratio set up to each of the content management numbers of the images displayed on the display unit 101 in the case of the image scrolling in the cascade display method. For example, the image of which the display parameter is "10%" and the content management number is "16" corresponds to the image of which the display ratio is "10%" in FIG. 3A. Moreover, the image of which the display parameter is "100%" and the content management number is "7" corresponds to the image of which the display ratio is "100%" in FIG. 3A. The image of which the display parameter is "80%" and the content management number is "14" corresponds to the image (start-time image) corresponding to the discontinuous area 302. It should be noted that the display parameter of the image of the content management number corresponding to the discontinuous area 302 is not limited to 80%, and may be a larger value or a smaller value as long as the discontinuity of the display ratio is recognizable.

FIG. 5B shows an example of the data configuration in a case where the start-time image is not included in the displaying objects of the image scrolling, and corresponds to FIG. 3B. Since the data configuration in FIG. 5B is the same as the data configuration in FIG. 5A except for a point that the display parameter corresponding to the start-time image is not set up, description for the data configuration in FIG. 5B is omitted.

Figure 6A:
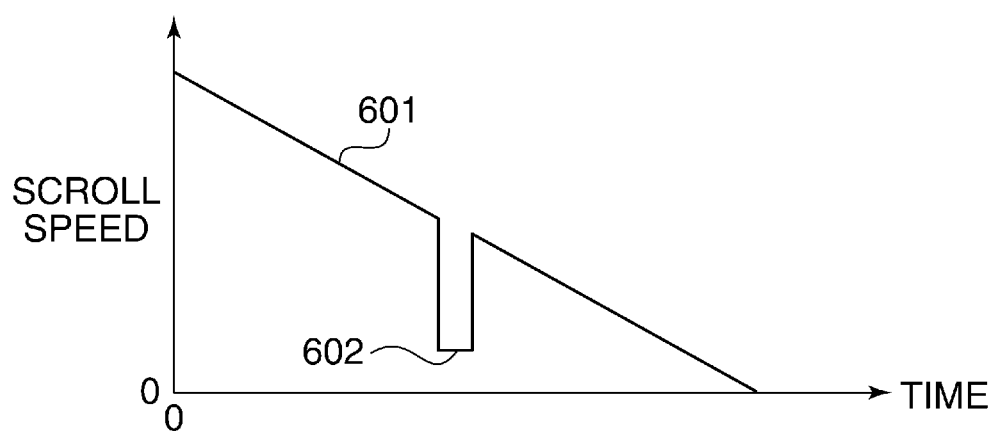
FIG. 6A and FIG. 6B are graphs showing a relationship between elapsed time and a scrolling speed in a tile display method in the information processing apparatus shown in FIG. 1.
Figure 6B:
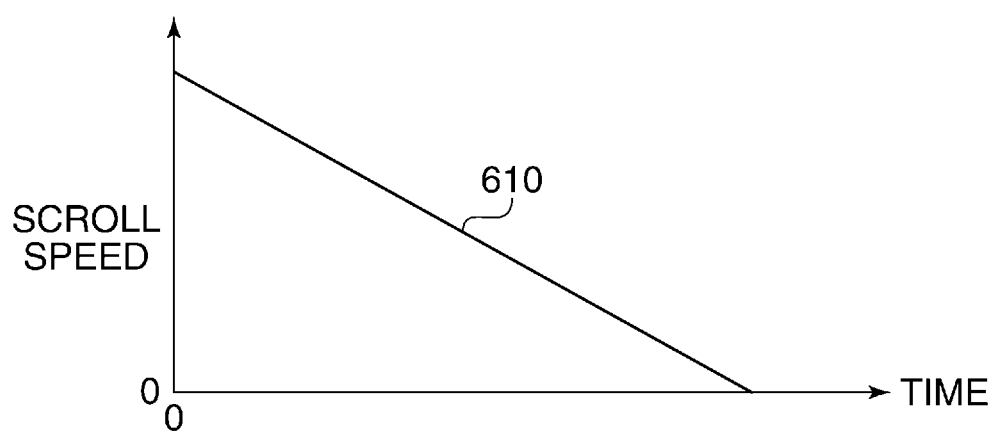

FIG. 6A and FIG. 6B are graphs showing a relationship between elapsed time and a scrolling speed (a moving speed) in the tile display method in the information processing apparatus 100. FIG. 6A shows a case where the start-time image is included in the displaying objects of the image scrolling. The scrolling speed is the fastest at the time of starting the image scrolling, and becomes slower with the passage of time as shown by a line 601. Since the image 63 is stored as the start-time image, the CPU 106 makes the image 63 as the start-time image correspond to a discontinuous area 602 and controls so as to facilitate visual recognition of the image 63 by decreasing the scrolling speed of the image 63 discontinuously. Thereby, the user easily grasps that the display area returned to the start-time image. When the images are further scrolled in the same direction (the direction decreasing the serial number of the image) after displaying the image 63 corresponding to the discontinuous area 602, the scrolling speed of an image becomes further slower along the line 601, and becomes zero (0) at the time of displaying the final image.

FIG. 6B shows a case where the start-time image is included in the displaying objects of the image scrolling. The scrolling speed of an image is the fastest at the time of starting the image scrolling, becomes slower with the passage of time as shown by a straight line 610, and becomes zero (0) at the time of displaying the final image. Although the slope of the straight line 610 is fundamentally the same as the slope of the line 601, the straight line 610 of which the slope is always constant differs from the line 601 that has the discontinuous area 602 in which the slope varies rapidly. It should be noted that the change of the display screen from the state A to the state E through the state B and the state D in FIG. 2 (the first image scrolling) follows the straight line 610. Accordingly, the display of the images is controlled so that the scrolling speed is adjusted by considering the operation speed for the image scrolling, etc., and so that the image scrolling stops without discomfort with the passage of time in the first image scrolling.

The above-mentioned description described the display control that enables the user to recognize easily that the display area returned to the start-time image during the image scrolling. The present invention is not limited to the above-mentioned description. For example, when an image that is displayed when an image scrolling direction (a moving direction of contents) is reversed is stored and the display of the stored image is controlled in the same manner as that for the start-time image, a desired image is found out from among a plurality of images efficiently.

That is, when searching for a content, such as an image, a user starts scrolling contents by scrolling the contents displayed on the display unit 101 in a first direction. In the description, the first direction shall be a direction in which the contents displayed on the display unit 101 are scrolled so as to increase the content management number 501. In that case, the CPU 106 stores the content used as the starting point of the content scrolling as a start-time content. The user shall reverse the scrolling direction of the contents when a first content is displayed during the content scrolling in the first direction, and start scrolling the contents in a second direction. Accordingly, the CPU 106 stores the first content. It should be noted that the second direction shall be a direction in which the contents are scrolled so as to decrease the content management number.

After that, the user shall reverse the scrolling direction of the contents again when a second content is displayed before displaying the start-time content, and start scrolling the contents in the first direction. At this time, the CPU 106 stores the second content. When the first content is displayed as a result of scrolling the contents in the first direction, the CPU 106 displays the first content at the display ratio that is larger than the display ratios of the contents before and after the first content. Alternately, when the first content is displayed as a result of scrolling the contents in the first direction, the CPU 106 displays the first content at the scrolling speed that is slower than the scrolling speed of the contents before and after the first content. Thereby, since the user easily recognizes that the contents were scrolled so as to reach the first content, the user is able to stop scrolling the contents in the first direction. Thus, since the content displayed when the scrolling direction is reversed (hereinafter referred to as a "reversed-time content") is stored and is treated as well as the start-time content, a search range is narrowed down without displaying unnecessary contents repeatedly.

Figure 7:
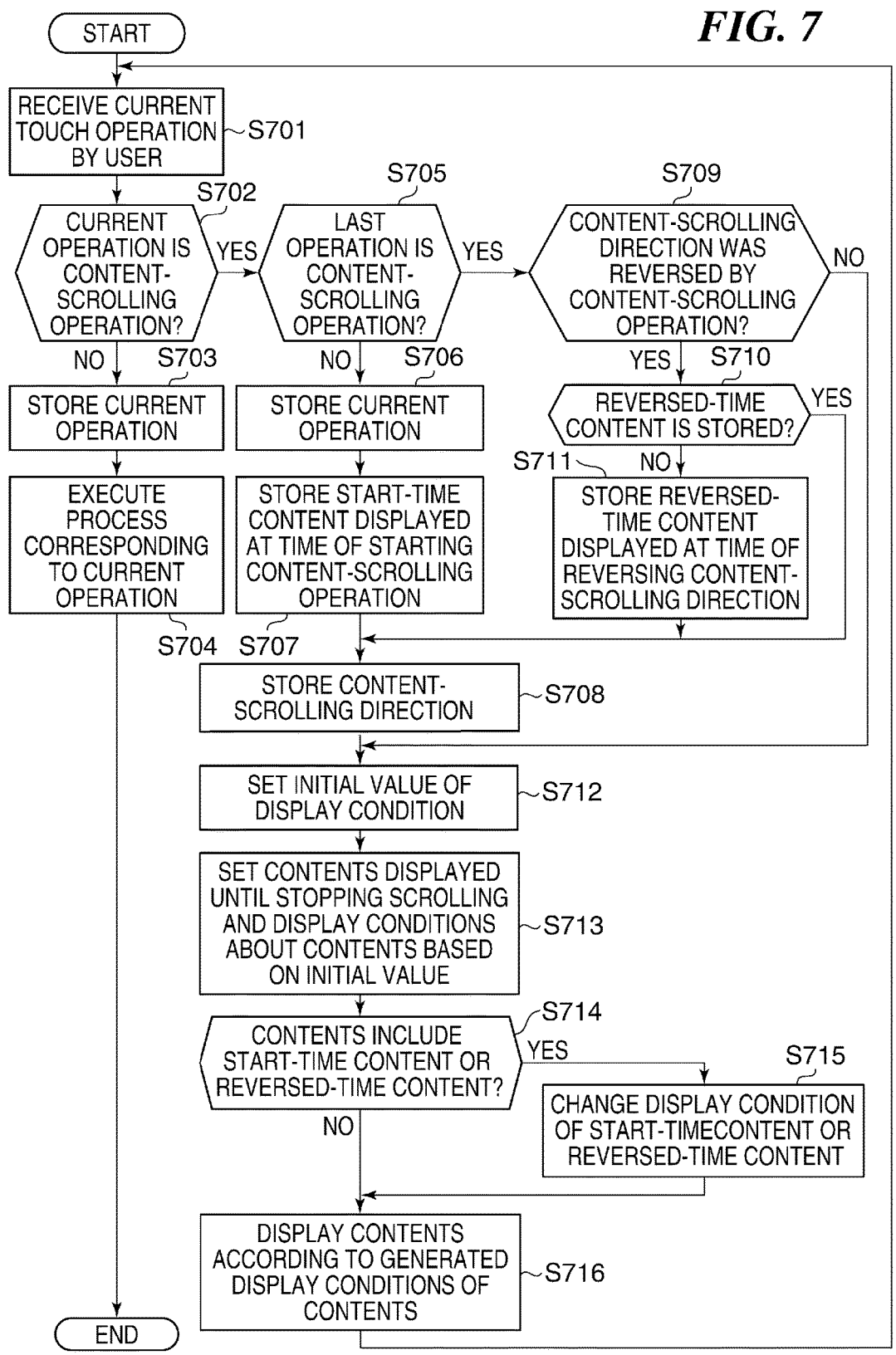
FIG. 7 is a flowchart showing a control process executed by the information processing apparatus shown in FIG. 1 when the information processing apparatus scrolls and displays contents.

FIG. 7 is a flowchart showing a control process of the information processing apparatus 100 at the time of scrolling and displaying contents with the information processing apparatus 100. Each process in the flowchart in FIG. 7 is achieved when the CPU 106 controls operations of units of the information processing apparatus 100 by reading a predetermined program from the ROM 107 and developing to the RAM 108.

In step S701, the CPU 106 receives a current touch operation to the touch panel by a user (hereinafter referred to a "user's current operation"). In step S702, the CPU 106 determines whether the user's current operation received in the step S701 is an operation for scrolling and displaying contents (hereinafter referred to as a "content-scrolling operation"). When determining that the user's current operation is the content-scrolling operation (YES in the step S702), the CPU 106 proceeds with the process to step S705. When determining that the user's current operation is not the content-scrolling operation (NO in the step S702), the CPU 106 proceeds with the process to step S703. In the step S703, the CPU 106 stores the user's current operation received in the step S701 to the RAM 108. In the following step S704, the CPU 106 performs a process corresponding to the user's current operation received in the step S701, and then, this process is finished.

In the step S705, the CPU 106 determines whether a user's last operation is the content-scrolling operation. For example, since the user's operation was stored in the step S703 or a step S706, the CPU 106 is able to determine whether the last operation is the content-scrolling operation. When determining that the user's last operation is the content-scrolling operation (YES in the step S705), the CPU 106 proceeds with the process to step S709. When determining that the user's last operation is not the content-scrolling operation (NO in the step S705), the CPU 106 proceeds with the process to the step S706.

In the step S706, the CPU 106 stores the user's current operation (a content-scrolling operation) received in the step S701 to the RAM 108. In the following step S707, the CPU 106 stores the start-time content displayed at a time of starting the content-scrolling operation to the RAM 108. Since a user's operation other than the content-scrolling operation is stored in the step S703, the CPU 106 stores the start-time content displayed every time when the content-scrolling operation is started after receiving the user's operation other than the content-scrolling operation. The CPU 106 proceeds with the process to step S708 after the step S707. In the step S708, the CPU 106 stores the scrolling direction of the contents.

In the step S709, the CPU 106 determines whether the scrolling direction of the content was reversed. Since the last scrolling direction of the contents was stored in the step S708, the last scrolling direction can be compared with the current scrolling direction of the content-scrolling operation that the user's current operation received in the step S701. When determining that the scrolling direction of the contents was not reversed (NO in the step S709), the CPU 106 proceeds with the process to step S712. When determining that the scrolling direction of the contents was reversed (YES in the step S709), the CPU 106 proceeds with the process to step S710. In the step S710, the CPU 106 determines whether the content displayed when the scrolling direction of the contents was reversed (hereinafter referred to as a "reversed-time content") has been stored. When determining that the reversed-time content has been stored (YES in the step S710), the CPU 106 proceeds with the process to the step S708. When determining that the reversed-time content has not been stored (NO in the step S710), the CPU 106 proceeds with the process to step S711.

In the step S711, the CPU 106 stores the reversed-time content to the RAM 108. Accordingly, when the contents are scrolled in response to the user's operation to reverse the scrolling direction of the contents again, the last reversed-time content can be treated as well as the start-time content. That is, it is controlled so that the reversed-time content is applied to the discontinuous area 302 in FIG. 3A to increase the display ratio discontinuously or the reversed-time content is applied to the discontinuous area 602 in FIG. 6A to decrease the scrolling speed discontinuously. The CPU 106 proceeds with the process to the step S708 after the step S711.

In the step S712 following the step S708, the CPU 106 sets up an initial value of a display condition, such as the display ratio in the case of using the cascade display method or the scrolling speed in the case of using the tile display method, in response to the operation speed of the content scrolling. In step S713, the CPU 106 sets up contents that are displayed on the display unit 101 until the content scrolling stops and display conditions of the contents on the basis of the initial value set up in the step S712. Thereby, the data for scrolling the contents shown in FIG. 5B is generated, for example.

In step S714, the CPU 106 determines whether the start-time content or the reversed-time content is included in the contents that are subjected to scrolling and displaying. When determining that the start-time content or the reversed-time content is included (YES in the step S714), the CPU 106 proceeds with the process to step S715. When determining that the start-time content nor the reversed-time content is not included (NO in the step S714), the CPU 106 proceeds with the process to step S716. In the step S715, the CPU 106 changes the display condition of the start-time content or the reversed-time content. Thereby, the data in FIG. 5A is generated on the basis of the data in FIG. 5B, for example. The CPU 106 proceeds with the process to step S716 after the step S715. In step S716, the CPU 106 scrolls and displays the contents according to the display conditions generated for the respective contents. The process in the flowchart in FIG. 7 corresponds to one user's operation. Accordingly, after the process in the step S716, the CPU 106 returns the process to the step S701, and receives a user's operation.

It should be noted that the scrolling direction of the contents may be reversed by two steps of the user's operations that include a tap operation to stop scrolling and a swipe operation to reverse the scrolling direction of contents. Moreover, the user's operation may be assisted by reversing the scrolling direction just after displaying the start-time content or the reversed-time content without performing the process in the step S715.

According to the display control of the flowchart in FIG. 7, when the start-time content or the reversed-time content is included in the contents displayed by scrolling, the display becomes discontinuous at the time of displaying the start-time content or the reversed-time content as described with reference to FIG. 3A and FIG. 6A. As a result of this, even if the scrolling direction of the contents is repeatedly reversed and the same content is displayed repeatedly, the user is able to recognize the start-time content or the reversed-time content easily on the way. Accordingly, since unnecessary contents are not repeatedly displayed on the basis of the start-time content or the reversed-time content when finding out the desired content, the user is able to find out the desired content in a short time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although the images are used as the contents in the above-mentioned embodiment, the contents that are subjected to scroll and display are not limited to the images. Movie frames, list data, etc. may be used as the contents.

Moreover, the above-mentioned embodiment enables the user to recognize the start-time content or the reversed-time content by introducing the discontinuity of the display ratio or the scrolling speed. Accordingly, visual effects, such as display decoration that designs a frame of a content so as to be floating, and adjustment of luminance, may be further applied to the discontinuity of the display. Thereby, the user is able to recognize the start-time content or the reversed-time content more easily. Moreover, although the swipe operation is premised as an operation to the touch panel for scrolling the contents in the above-mentioned embodiment, a flick operation may be used. Furthermore, although the scrolling speed is controlled so as to decrease from the start to the end in the tile display method described with reference to FIG. 6A, the scrolling speed may be controlled so as to be constant and the start-time content or the reversed-time content may be displayed at a later speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-200148, filed Oct. 11, 2016, which is hereby incorporated by reference herein in its entirety.

What is claimed is:

1. An information processing apparatus comprising:
   a memory configured to store instructions;
   a processor configured to execute the instructions to provide a display control unit configured to scroll and display at least parts of respective contents on a screen by moving the contents in a predetermined direction; and
   a storage configured to store, at a start of a content-scrolling operation, a start-time content displayed at a time of starting to scroll and, at a reversing of a direction of the content-scrolling operation, a reverse-time content displayed at a time of reversing the direction of the content-scrolling operation,
   wherein the display control unit is configured to display a larger part of the start-time content and the reverse-time content than the displayed parts of other contents when the start-time content and the reverse-time content is displayed again irrespective of whether the direction of the content-scrolling operation is reversed again when the start-time content or reverse-time content is displayed.

2. The information processing apparatus according to claim 1, wherein the display control unit is configured to increase the displayed part of the other contents with passage of time when the contents are moved in the predetermined direction.

3. The information processing apparatus according to claim 1, wherein the display control unit is configured to display the start-time content in a state that is visually different from a state of the other contents.

4. An information processing apparatus comprising:
   a memory configured to store instructions;
   a processor configured to execute the instructions to provide a display control unit configured to scroll and display at least parts of respective contents on a screen by moving the contents in a predetermined direction; and
   a storage configured to store, at a start of a content-scrolling operation, a start-time content displayed at a time of starting to scroll and, at a reversing of a direction of the content-scrolling operation, a reverse-time content displayed at a time of reversing the direction of the content-scrolling operation,
   wherein the display control unit is configured to display the start-time content and the reverse-time content at a moving speed slower than a moving speed of other contents when the start-time content and the reverse-time content is displayed again irrespective of whether the direction of the content-scrolling operation is reversed again when the start-time content or reverse-time content is displayed.

5. The information processing apparatus according to claim 4, wherein the display control unit is configured to decrease the moving speed of the other than contents with passage of time when the contents are moved in the predetermined direction.

6. The information processing apparatus according to claim 4, wherein the display control unit is configured to display the start-time content in a state that is visually different from a state of the other contents.

7. A control method for an image processing apparatus, the control method comprising:
   scrolling and displaying at least parts of respective contents on a screen by moving the contents in a predetermined direction; and
   storing, at a start of a content-scrolling operation, a start-time content displayed at a time of starting to scroll and, at a reversing of a direction of the content-scrolling operation, a reverse-time content displayed at a time of reversing the direction of the content-scrolling operation,
   wherein, in the scrolling and displaying, a displayed part of the start-time content and the reverse-time content is larger than a displayed part of other contents when the start-time content and the reverse-time content is displayed again irrespective of whether the direction of the content-scrolling operation is reversed again when the start-time content or reverse-time content is displayed.

8. A control method for an image processing apparatus, the control method comprising:
   scrolling and displaying at least parts of respective contents on a screen by moving the contents in a predetermined direction; and
   storing, at a start of a content-scrolling operation, a start-time content displayed at a time of starting to scroll and, at a reversing of a direction of the content-scrolling operation, a reverse-time content displayed at a time of reversing the direction of the content-scrolling operation,
   wherein, in the scrolling and displaying, a moving speed of the start-time content and the reverse-time content becomes slower than a moving speed of other contents when the start-time content and the reverse-time content is displayed again irrespective of whether the direction of the content-scrolling operation is reversed again when the start-time content or reverse-time content is displayed.

9. A non-transitory computer-readable storage medium storing a control program causing a computer to execute a control method for an information processing apparatus, the control method comprising:
   scrolling and displaying at least parts of respective contents on a screen by moving the contents in a predetermined direction; and
   storing, at a start of a content-scrolling operation, a start-time content displayed at a time of starting to scroll and, at a reversing of a direction of the content-scrolling operation, a reverse-time content displayed at a time of reversing the direction of the content-scrolling operation,
   wherein, in the scrolling and displaying, a displayed part of the start-time content and the reverse-time content is larger than a displayed part of other contents when the start-time content and the reverse-time content is displayed again irrespective of whether the direction of the content-scrolling operation is reversed again when the start-time content or reverse-time content is displayed.

10. A non-transitory computer-readable storage medium storing a control program causing a computer to execute a control method for an information processing apparatus, the control method comprising:
   scrolling and displaying at least parts of respective contents on a screen by moving the contents in a predetermined direction; and storing, at a start of a content-scrolling operation, a start-time content displayed at a time of starting to scroll and, at a reversing of a direction of the content-scrolling operation, a reverse-time content displayed at a time of reversing the direction of the content-scrolling operation, wherein, in the scrolling and displaying, a moving speed of the start-time content and the reverse-time content becomes slower than a moving speed of other contents when the start-time content and the reverse-time content is displayed again irrespective of whether the direction of the content-scrolling operation is reversed again when the start-time content or reverse-time content is displayed.

* * * * *